United States Patent Office 3,374,373
Patented Mar. 19, 1968

3,374,373
CONTROLLED-VELOCITY DRIVE
Frederick Hart Calvert, Kenosha, Wis., assignor to Eaton Yale & Towne, Inc., Cleveland, Ohio, a corporation of Ohio
Continuation of application Ser. No. 361,851, Apr. 22, 1964. This application Apr. 22, 1967, Ser. No. 642,619
11 Claims. (Cl. 310—94)

ABSTRACT OF THE DISCLOSURE

A solid-state speed control is disclosed in which the energization of the field winding of an eddy-current coupling is controlled in response to a tachometer feedback signal, which represents the coupling output speed, and a pair of signals which vary as functions of the field winding current. One of the pair of current responsive signals is applied substantially directly to effect degenerative feedback and the other is delayed and applied to effect regenerative feedback.

Cross-reference to related application

This application is a continuation of application Ser. No. 361,851, filed Apr. 22, 1964, now abandoned.

Background of the invention

This invention relates to a controlled-velocity drive and more particularly to a solid-state switching control for an electromagnetic coupling device, for example an eddy-current clutch or the like.

This invention is an improvement of the control disclosed in coassigned copending application Ser. No. 310,093, filed Sept. 19, 1963. The control of this invention provides an even closer speed regulation (viz, in the order of about 0.5% as compared to the nonetheless close regulation of about 1% of the control of the aforesaid application) without any significant sacrifice in stability and without any appreciable extra expense, circuit complexity, or loss in compactness.

Summary of the invention

Among the several objects of this invention may be noted the provision of a solid-state switching control for an electromagnetic coupling device having improved speed regulation characteristics over a greatly extended speed range; the provision of a speed-control system which is critically damped so that optimum response to speed and load changes is obtained while undesirable system oscillations are inherently resisted; the provision of a control of the class described which has relatively low thermal and inherent drift characteristics; and the provision of a speed control system which is relatively inexpensive, easily and inexpensively maintained, and which exhibits a high degree of reliability in operation. Other objects and features will be in part apparent and in part pointed out hereinafter.

Essentially the invention relates to a control circuit to be employed in a controlled-velocity drive having a driven member and a winding the energization of which controls the speed of the driven member, a source of electrical power, and a solid-state switching device, for example a silicon controlled rectifier, interconnected between the source and the control winding and adapted selectively to control the energization of this winding thereby to regulate the angular velocity of said driven member. This control includes means for producing a reference voltage proportional to a preselected angular velocity of the driven member, a first feedback circuit including a tachometer for sensing the angular velocity of the driven member and producing a first feedback signal which varies as a function thereof, a second feedback circuit responsive to the current through said winding and providing a second feedback signal which varies as a function of this current, and a third feedback circuit including a delay network also responsive to the current through said winding and providing a regenerative feedback signal which varies as a function of this current. The control further comprises means responsive to the reference voltage and to the three feedback signals for selectively actuating the solid-state switching device to maintain the angular velocity of the driven member substantially equal to the preselected angular velocity.

According to a preferred form of the invention, the control for the solid-state switching device includes a capacitor and a charging circuit for this capacitor which includes a first electronic transducer, for example a transistor, interconnected with the capacitor, the conductivity of this transducer controlling the charging rate of the capacitor. Also preferably included is a trigger circuit responsive to the voltage across the capacitor for pulsing the switching device thereby causing energization of the control winding of the electromagentic coupling device when the voltage across the capacitor reaches a pre-established level. Further, it is preferred to include a second transducer, for example a second transistor, interconnected with the first transducer in a differential amplifier circuit having a first input comprising a first summing junction to which the reference voltage and first two feedback signals are applied, and a second input comprising a second summing junction to which the regenerative feedback signal is applied; these two differential amplifier transducers desirably being positioned on a common heat sink which inherently compensates for varying temperature conditions thereby obviating thermal drift problems and compensates for variations in the charging rate of the capacitor brought about by varying ambient temperature conditions. Moreover, it is preferred that the third feedback circuit and delay network include an RC circuit to effect an attenuation in system frequency response, and a capacitance multiplier.

Brief description of the drawings

Corresponding reference characters indicate corresponding parts throughout the several views of the drawings.

Description of the preferred embodiment

Figure 1:
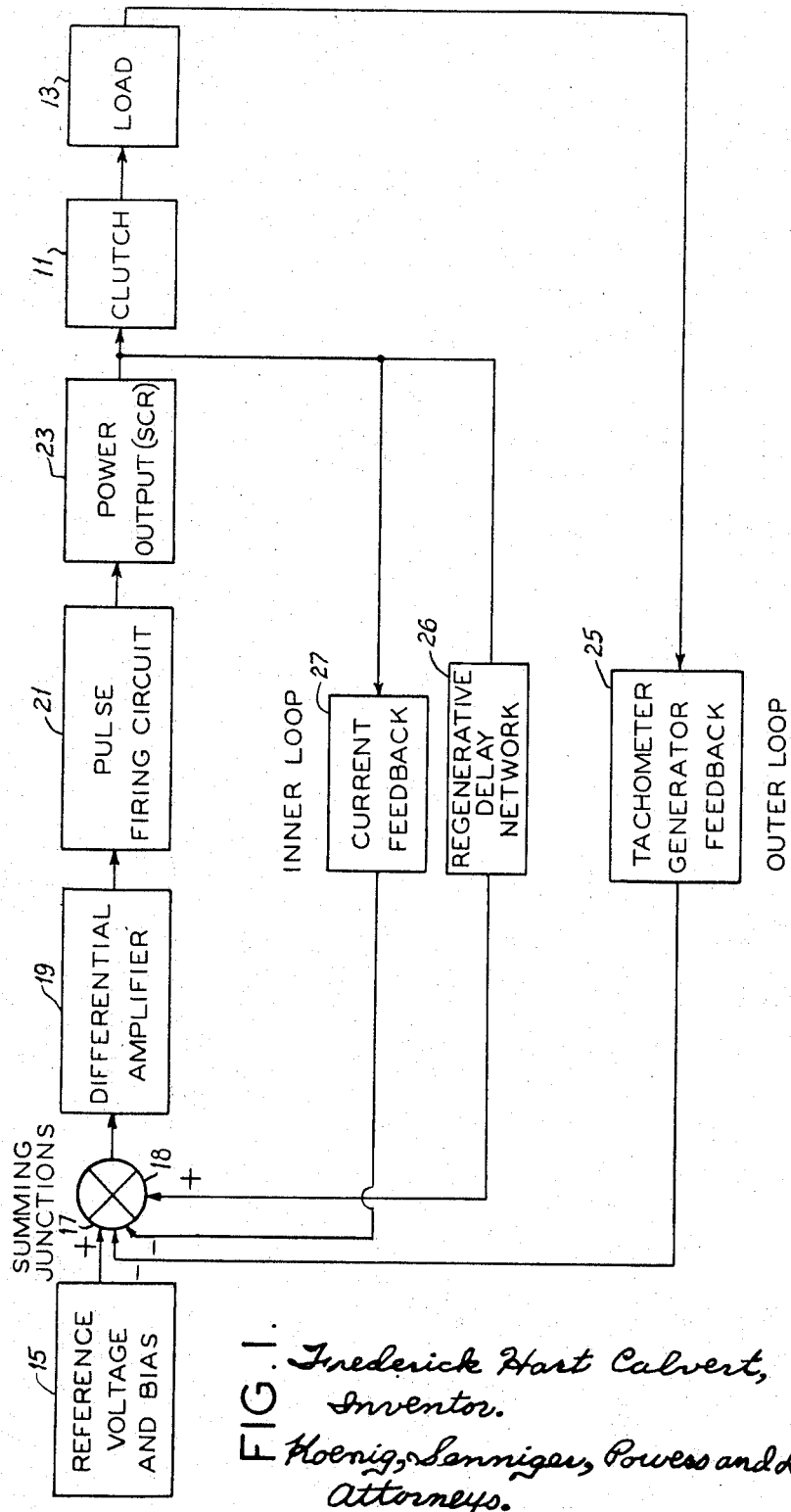
FIG. 1 is a block diagram illustrating functionally the major components of this invention and their interconnection.

Referring now to the drawings, and more particularly to FIG. 1, the present invention comprises a solid-state switching control for selectively energizing the field or control winding of a electromagnetic slip coupling device, for example an eddy-current clutch, or that of a D.C. motor. An eddy-current clutch is indicated by the block 11 in FIG. 1. It functions to couple power from a rotating driving member (not shown) to a load or driven member indicated at 13. The control serves to energize this clutch to maintain the angular velocity of the driven member equal, or substantially equal (for example within 0.5% regulation), to a preselected or desired angular velocity. A reference voltage source 15 is provided to supply a reference voltage having a magnitude proportional to this preselected angular velocity. This reference voltage is applied to a first or positive summing junction indicated at 17 which, as explained in connection with FIG. 2, comprises a solder junction within the control circuit. The outputs of two negative feedback loops disclosed hereinafter are also applied to junction 17. The output of a third positive or regenerative feedback loop is applied to a second or negative summing junction 18 for purposes to be disclosed below. The composite output of these junctions (i.e., the algebraic sum of the signals applied thereto) is in turn applied to the input of a differential amplifier 19 which serves to control the triggering of a pulse firing circuit 21. The latter controls the energization of a solid-state switching device 23, which may for example include a silicon controlled rectifier and which serves to control the energization of clutch 11 to maintain the speed of the driving member 13 equal to the preselected speed.

A tachometer generator 25 is driven by the driven member to sense the angular velocity thereof. The output of this generator is applied as indicated to summing junction 17 to form a negative feedback circuit responsive to incipient variations in the speed of the driven member under control. As indicated in FIG. 1, this tachometer generator feedback forms an outer feedback loop. An inner feedback loop is provided by a current feedback control indicated at 27, while a third or regenerative feedback circuit including a delay network is indicated at 26. These latter two feedback loops or circuits respond to changes in the energization of, or current through, the clutch coil 11 and act to modify the power output accordingly. As explained hereinafter, circuits 26 and 27 form high gain sensitivity feedback loops which lessen the response time of the control, and improve regulation while insuring against undesirable system oscillations.

Figure 2:
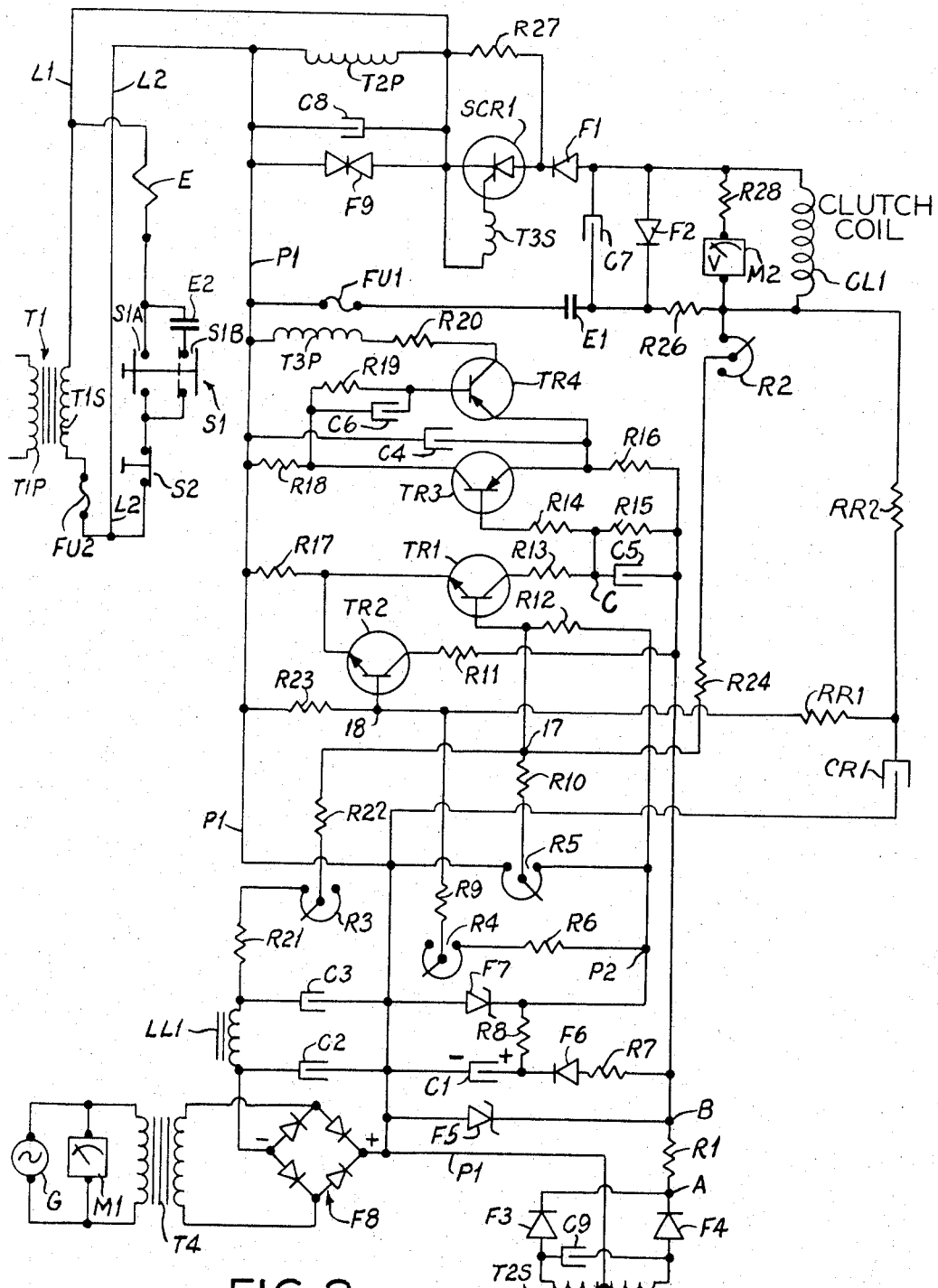
FIG. 2 is a schematic circuit diagram of the FIG. 1 system.

Referring now to FIG. 2 which illustrates the individual components which make up the FIG. 1 system and their interconnection, power for the control system is provided by a transformer T1 having a primary winding T1P and a secondary winding T1S. The former may be connected across a 220 v. or 440 v. A.C. source, for example, while the latter supplies A.C. power to the control circuit at 115 v. A.C. Connected across secondary winding T1S by a pair of conductors L1 and L2 and a fuse FU2 is the primary winding T2P of second transformer T2 which includes a center-tapped secondary winding T2S (shown at the bottom portion of the FIG. 2 schematic). A conventional "Jog-Run-Stop" control for the electromagnetic coupling device is provided by a jog-run switch S1 (having a first portion S1A and a second portion S1B), a stop switch S2, and a relay, the coil of which is indicated at E and the normally open contacts of which are shown at E1 and E2. To provide a momentary energization of the clutch winding (i.e., to provide a jog control) switch portion S1A is closed momentarily (contacts S1B remaining open) thereby energizing coil E and closing contacts E1 for a brief period. If the clutch is to remain energized (i.e., if a "run" operation is called for), both portions or contacts of switch S1 are closed. This not only energizes coil E, but also completes a holding circuit through contacts S1B and E1 to maintain coil E energized until stop switch S2 is opened.

The reference voltage and bias supply of the FIG. 1 control is illustrated in FIG. 2 as including transformer T2, the center-tapped secondary of which is connected to supply power to a pair of rectifying diodes F3 and F4 which provide an unfiltered full-wave-rectified pulsating D.C. potential between a point or junction A and the center tap of secondary winding T2S. The latter is connected to a junction or bus P1 which forms the common bus of the circuit. A capacitor C9 is connected across winding T2S to provide a low impedance shunt to high frequency line transients. In addition to protecting diodes F3 and F4, this capacitor C9 serves to prevent misfiring of the pulse firing circuit described below. The wave form of the potential at point A with respect to point P1 is shown at A in FIG. 3.

A current limiting resistor R1 is connected in series with a Zener diode F5. The latter provides a clipping action thereby providing at point B a wave form as illustrated in FIG. 3B. The average D.C. potential of this FIG. 3B potential (again with respect to point P1) is +12 volts ±10%. The unfiltered potential appearing at point B is employed to provide power to the differential amplifier and the pulse firing circuit both described hereinafter. Because Zener diode F5 is not temperature compensated, the average D.C. potential at point B may vary with temperature.

A temperature compensated reference and bias supply portion of the circuit is interconnected with point B by a current limiting resistor R7 and an isolating or blocking diode F6. A filtering or smoothing capacitor C1 is connected between the cathode of diode F6 and point P1. The potential across this capacitor may be, for example, on the order of 11.5 v. D.C. Diode F6 prevents this potential from being applied to the differential amplifier or pulsing circuit. Connected across capacitor C1 is a regulating resistor R8 connected in series with a temperature compensated Zener diode F7. This series circuit provides a temperature compensated continuous D.C. potential between a point P2 and junction P1. This reference potential may have a value, for example, of from +8.55 v. to +9.45 v.

A rheostat or variable resistance R4 and a pair of fixed resistance R6 and R9 are connected in series between point P2 and a negative summing junction indicated at reference numeral 18. As will be apparent hereinafter, the setting of variable resistance R4 determines the minimum current through the clutch coil when the control is set for zero run speed.

A potentiometer R5 which constitutes the reference or run speed potentiometer is connected across points P1 and P2, and the movable arm or slider of this potentiometer is connected by a resistor R10 to the positive summing junction or point 17, this point corresponding to junction 17 in FIG. 1. Potentiometer R5 may be set to any desired or preselected angular velocity of the driven member and provides at its movable arm a voltage which is proportional to or an analog of this preset velocity.

The tachometer feedback portion of the FIG. 2 control includes an A.C. generator or tachometer G mounted on the output shaft of the eddy-current coupling device. This generator has a voltage and frequency output which varies as a function of, or is proportional to, the output shaft velocity. A meter M1 is connected across the output of generator G to provide an indication of this output. Generator G feeds an isolation transformer T4 and a full-wave bridge type rectifier indicated at F8. The output of rectifier F8 is filtered by a smoothing network or circuit consisting of a pair of capacitor C2 and C3 and a choke coil LL1. The latter is a swinging choke effetcive only at very low frequencies and currents. The rectified and filtered output of feedback generator G is applied through a pair of fixed resistors R21 and R22 series connected with a rheostat R3 to summing junction 17.

Variable resistance R3 constitutes a control the setting of which determines the maximum speed of the driven member or load. The proper adjustment for resistance R3 is made with the run speed potentiometer R5 set at its maximum speed setting under rated load conditions. Rheostat R3 is then adjusted so that the output of the coupling is rotated at the nameplate maximum rated output speed.

It will be appreciated that because the reference potential appearing at the movable arm of potentiometer R5 has a polarity which is opposite to the polarity of the tachometer feedback signal appearing at the arm of rheostat R3 (the former being positive with respect to point P1 and the latter being negative with respect thereto), the currents applied to summing junction 17 have opposite signs, i.e., the current from the reference potentiometer flows into this point whereas current flows from the summing junction through resistor R2. Current also flows from this junction through a resistor R24 which, as explained hereinafter, constitutes a portion of the inner or current feedback loop. The algebraic sum of these currents is applied to the control electrode or base of a transistor TR1 which constitutes one of the transistors of the differential amplifier portion of the control. The other transistor of this amplifier is indicated at TR2.

A common emitter resistor R17 is interconnected between the emitters of transistors TR1 and TR2 and point P1, and a pair of matched load resistors R11 and R13 are connected to the respective collectors of these transistors. Resistor R11 is connected directly to point B while resistor R13 is connected to one terminal of a capacitor C5, the other terminal of which is connected to junction B. A current limiting resistor R12 connects the base of transistor TR1 with terminal P2. A similar resistor R23 connects the base of transistor TR2 with terminal or junction P1. The common connection between elements R13 and C5, point or junction C, constitutes the output terminal of the differential amplifier. The wave form of the potential appearing at the point C is illustrated in FIG. 3C. This potential, as explained hereinafter, controls the triggering or toggling of the pulse firing circuit, the latter in turn controlling the actuation of the solid-state switching device.

The pulse firing circuit consists of a modified Schmitt trigger circuit consisting of a pair of transistors TR3 and TR4, a common emitter resistor R16, and a pair of matched load resistors R18 and R20. A coupling network consisting of a resistor R19 and a shunt-connected capacitor C6 interconnects the collector of transistor TR3 with the base of transistor TR4. A filtering capacitor C4 is provided between common emitter resistor R16 and point P1 to maintain the threshold level of the Schmitt trigger circuit substantially constant regardless of transients in the system. The output of the differential amplifier appearing at point C is coupled through a current limiting resistor R14 to the base of transistor TR3. The common connection between resistor R14 and capacitor C5 is connected to point B by a resistor R15.

The output of the pulse firing circuit is coupled by an isolating pulse transformer to the gate electrode of a silicon controlled rectifier SCR1, the latter constituting the solid-state switching device mentioned above. The SCR1 and its associated components make up the power output portion of the control. The primary of the pulse transformer, indicated at T3P, is connected in the output circuit of the modified Schmitt trigger, between load resistor R20 and point P1. The secondary winding of this transformer is connected between the gate or control electrode of SCR1 and its cathode.

The field or control winding of the electromagnetic clutch or coupling device under control is indicated at CL1. This coil is connected in series with a fuse FU1, contacts E1, a resistor R26, a diode F1, and the anode-cathode circuit of SCR1, and the resulting series loop is connected across lines L1 and L2. A back rectifier F2 connected across coil CL1 shorts out off-cycle transients in the coil, making the latter appear, for all practical purposes, to be a resistive load. Diode F1 and a resistor R27 are secondary protective devices which serve to protect the controlled rectifier SCR1 from high PIV's and also to prevent misfiring thereof from high transient voltages. Transient supression capacitors C7 and C8 are connected respectively across clutch coil CL1 and secondary winding T2P to provide low impedance paths for high frequency transients appearing in the circuit. A surge resistor indicated at F9 is connected across winding T2P to protect the circuit from low frequency line transients.

A voltmeter M2 in series with a resistor R28 is connected across coil CL1 to provide a continuous indication of the dregree of energization or excitation thereof.

As resistor R26 is serially connected with clutch coil CL1, it senses the current flow through this winding, developing a potential thereacross which is proportional to the clutch coil current. Both the negative current feedback inner loop 27 and the regenerative delay network loop 26 commonly include resistor R26. Negative feedback loop 27 further includes a rheostat R2, which serves as a sensitivity control for the system, and a resistor R24 connected to the positive summing junction 17. Positive feedback loop 26 further includes a resistor RR2 and a capacitor CR1 serially connected across R26, i.e., from common bus P1 to the junction of R26 and coil CL1. Resistor RR2 and capacitor CR1 constitute an RC circuit, the junction between these two circuit components being connected via a resistor RR1 to negative summing junction 18. As the potential applied to this junction is a negative feedback signal and the junction is a negative summing junction, the feedback is positive or regenerative. The capacitor CR1 stabilizes the system by effecting a rolling off of the higher frequencies, i.e., an attenuation of the system's frequency response.

Operation of the FIG. 2 control is as follows:

The low bias rheostat R4 is initially adjusted to establish a minimum current level through the clutch coil when the run speed potentiometer R5 is set at zero. It has been established that in a typical case rheostat R4 should be adjusted to provide for 5% excitation of the clutch coil when the run speed potentiometer is set at zero. This setting produces optimum thermal drift characteristics.

The run speed potentiometer R5 is then adjusted or set to the desired angular velocity of the driven member. A properly calibrated knob or dial, for example, could be provided to facilitate this adjustment. Switch S1 is then actuated to its "run" position. As explained above, this latter action completes a circuit which energizes relay coil E thereby causing normally open contacts E1 and E2 to close. The closing of contacts E2 establishes a holding circuit for coil E, while the actuation of contacts E1 connects the series circuit including the clutch coil CL1 and SCR1 across lines L1 and L2. Thereafter, the degree of energization of the clutch coil depends upon the selective actuation of SCR1, or more particularly, the period or length of time during which this SCR1 is rendered conductive during a cycle of the A.C. appearing across L1 and L2. It will be appreciated that because of the polarity of diode F1 and SCR1, coil CL1 can only be energized during the negative half-cycles of this A.C. potential.

Adjustment of potentiometer R5 causes a positive potential having a value proportional to the preset speed to be coupled through resistance R10 to the base of transistor TR1. Since the emitter-collector circuit of this transistor is series-connected with capacitor C5, the conductivity of this transistor controls the charging rate of this capacitor. Stated somewhat differently, capacitor C5, resistor R13, the emitter-collector circuit of TR1, and resistance R17 constitute an RC circuit, the R of which is controlled by the base-emitter potential of transistor TR1. Thus, increasing the positive potential at summing junction 17 causes capacitor C5 to charge at a more rapid rate.

Since the potential across a capacitor cannot change instantaneously, the potential at point C builds up concurrently with the leading edge of a pulse at point B. Initially, i.e., in the quiescent state, transistor TR4 of the modified Schmitt trigger circuit is conducting and transistor TR3 cut off. As the potential at point C builds up to exceed the threshold level of the Schmitt trigger (assumed for purposes of explanation to be 10 volts), transistor TR3 is triggered into conduction. Periods of conduction of TR3 are shown in FIG. 3D. Concurrently, transistor TR4 is cut off or rendered nonconducting. This causes a negative-going pulse (shown in FIG. 3E) to be coupled through secondary winding T3S to the gate of SCR1, thereby insuring that the SCR is in its off or nonconducting state during periods of conduction of transistor TR3.

The charging of capacitor C5 causes the potential at point C to decrease at a rate proportional to the charging rate of the capacitor. This decreasing potential is indicated at C' in FIG. 3C, the downward slope of this portion being a function of the conductivity of transistor TR1. Transistor TR3 remains conducting until the portion C' reaches the 10-volt trigger level of the Schmitt circuit, at which time transistor TR3 is cut off. This causes conduction of transistor TR4 which in turn causes a positive pulse spike to be coupled to the gate or control electrode of SCR1. Assuming proper polarity of the A.C. potential across L1 and L2, this spike causes conduction of SCR1 and concurrent energization of coil CL1. The pulse applied to this coil is shown in FIG. 3F, it being assumed that during the first half-cycle of the FIG. 3 wave forms line L1 is negative with respect to line L2.

It will be apparent that the duration of the pulse shown in FIG 3F (and hence the degree of energization of the coil CL1) is dependent solely on the charging rate of capacitor C5. This charging rate is in tun dependent upon the potential at junction 17.

Figure 3:
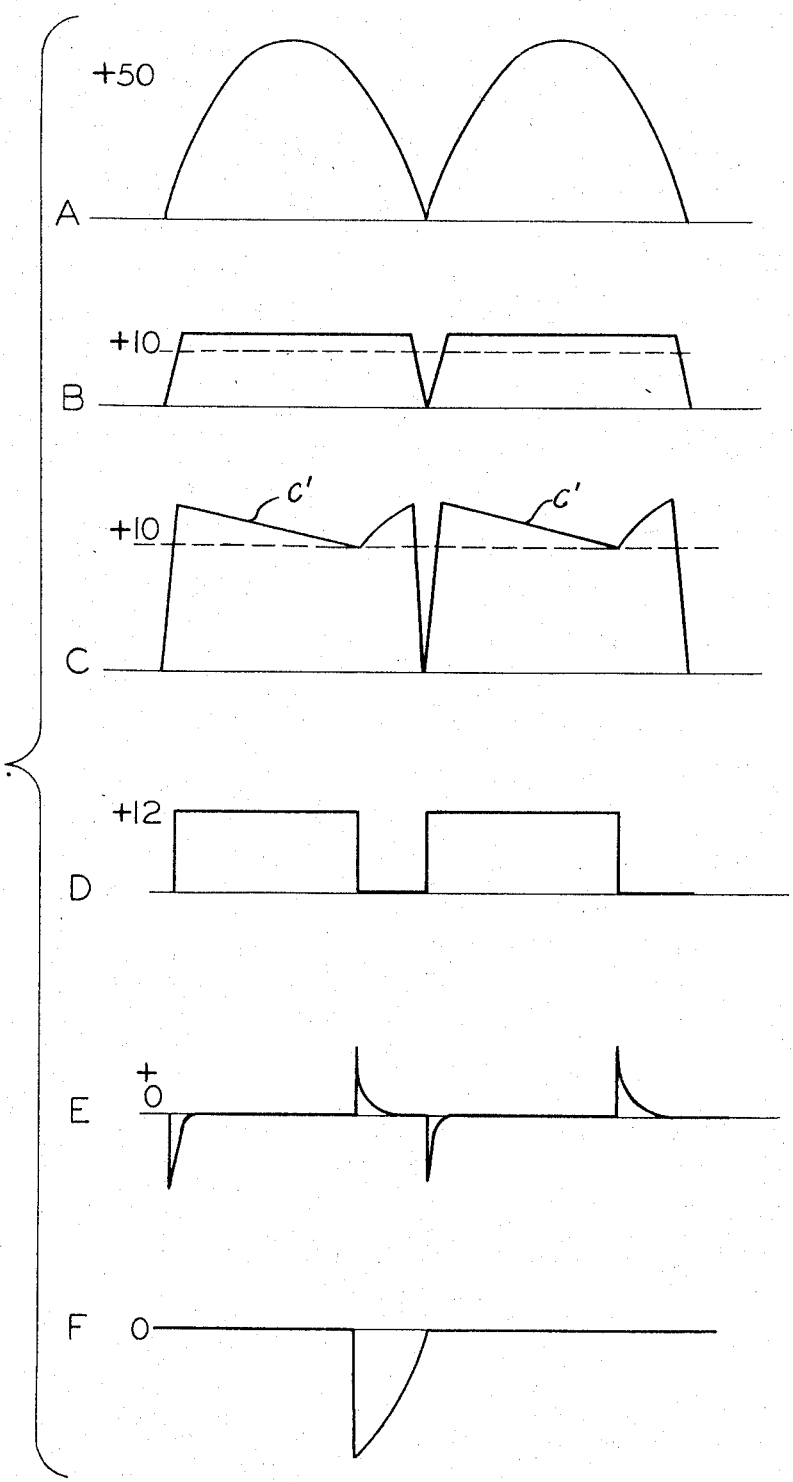
FIG. 3 illustrates various wave forms useful in explaining the operation of the FIG. 2 control.

During the subsequent half-cycle of the FIG. 3 wave forms the same control functions take place, i.e., the pulse firing circuit again triggers the gate of SCR1; however, a pulse is not applied to the clutch coil since line L1 is positive with respect to line L2. It will be understood that if a pair of SCR's are interconnected with coil CL1 to form a full-wave configuration (as opposed to the half-wave arrangement illustrated in FIG. 2), a pulse having a controlled duration would be applied to coil CL1 during each half-cycle of the A.C. applied to lines L1 and L2.

Energization of coil CL1 couples the driving member (for example a motor) with the rotatable driven member or load 13. The angular velocity of the driven member depends for the most part on the degree of energization of coil CL1. To sense this angular velocity and feed back a control signal proportional thereto, tachometer generator G is, as mentioned above, mounted on the output shaft of the coupling device. Immediately after initial energization of coil CL1, the output of the generator feedback (coupled through resistor R2 to point 17) is at a very low value. Consequently, the positive potential at summing junction 17 is at a relatively high value. This increases the conductivity of transistor TR1, causes capacitor C5 to be charged at a rapid rate, and thereby increases the power supplied to the clutch coil through SCR1. This increases the coupling between the driving and driven members, increasing the speed of the latter. The resulting increase in speed is sensed by generator G which provides an increasingly negative voltage to point 17, reducing the base-emitter bias on transistor TR1 and thereby reducing the charging rate of capacitor C5. This in turn reduces the time during which SCR1 is conductive and thus reduces the degree of energization of coil CL1. When the speed of the driven member reaches the preset level, the current supplied to coil CL1 is sufficient merely to maintain this desired speed. Excursions in the actual speed of the load above or below the desired speed are sensed by the tachometer feedback, and the power to coil CL1 is either increased or decreased, whichever action is necessary to bring the actual speed back to the desired level.

To provide a tighter speed control, i.e., to maintain the speed of the driven member more nearly equal to the preset speed, and to decrease the response time of the system, inner feedback loop 27 senses the current through the clutch coil CL1 and applies a negative feedback signal to point 17 proportional to this current. The regenerative feedback-delay network 26 also senses this current and applies positive feedback (i.e., negative feedback to the negative summing junction 18) to the input of the differential amplifier. Once the desired speed has been attained, incipient variations in the current through coil CL1 are reflected back to the summing junctions 17 and 18 in the form of degenerative and regenerative feedbacks. The degenerative feedback requires a somewhat higher overall gain for the system; however, depending on the setting of rheostat R2, the response time can be considerably reduced, for example, by a factor of 10. And since this response time can be reduced synthetically, a system which would be unstable can be made to be stable. For example, if the closed loop is unstable with a total response time T equal to .3 second, reducing this response time synthetically to a value of .03 second assures that the system will be stable. This not only insures against system oscillations, but also permits the deign of a system which is critically damped.

It is to be noted that the torque versus current gain characteristics of the usual electro-magnetic coupling are such that at very low slip the change in current necessary to effect the same torque increase is much greater than at high slip. In view of this and to improve the stability as well as the system regulation, the regenerative feedback delay network is provided. Thus, the regenerative feedback is delayed, or caused to roll off in frequency response, at least one decade below the system roll-off when regenerative feedback is not present. This attenuation is effected by capacitor CR1. It will be noted also that the negative current feedback provided, among other reasons, for improved stability, becomes a positive feedback for better regulation when fed into the negative summing junction 18.

To reduce thermal drift in the speed regulation caused by varying ambient temperature conditions, a differential amplifier configuration is provided to control the charging rate of capacitor C5. The beta gain of a transistor, i.e. the D.C. bias gain, varies considerably as a function of temperature. As temperature increases, the base-emitter resistance of a transistor decreases, and if a fixed base-emitter bias is applied, this decrease in resistance brings about an increase in the base-emitter current. This in turn causes an appreciable increase in the collector-emitter resistance. Thus, if transistor TR1 alone were provided to control the charging rate of capacitor C5, this charging rate would vary as a result of temperature variations. Transistor TR2, however, in effect operates as a temperature compensating transducer which maintains the conductivity of transistor TR1 substantially independent of temperature changes.

Transistors TR1 and TR2 are preferably mounted in a common heat sink, physically coupled together so that the two transistor cases are at substantially the same temperature. Thus an increase in the temperature of TR1 (causing an increase in the conductivity thereof) is accompanied by a corresponding increase in the temperature of TR2. This increases the conductivity of the collector-emitter circuit of TR2 causing in turn an increase in the current through common emitter resistor R17. The increased current through R17 raises the positive potential at the emitter of transistor TR1, thereby altering the base-emitter bias of this transistor TR1. If the two transistors are selected to have approximately equal gains, the variation in the base-emitter bias of transistor TR1 just compensates for the temperature-induced bias-emitter resistance variation. This insures that the base-emitter current of TR1 (the parameter which controls the conductivity of the collector-emitter circuit thereof) remains substantially independent of temperature changes.

In one specific application of the FIG. 2 control, the speed regulation was within ±0.5% over a controlled speed range of 33 to 1. This is to be compared with prior-art systems wherein a good value of speed regulation is ±2% over a 10 to 1 speed range. The damping factor was somewhat greater than .7 and approached the optimum factor of .707; the thermal drift was less than .02% per ° F.; and the inherent drift (i.e., changes in speed caused, for example, by diode commutations, transistor shot noises, SCR commutations, damped oscillations from the LC network, etc.) was less than ± one r.p.m. at all operating speeds within the speed range.

Figure 4:
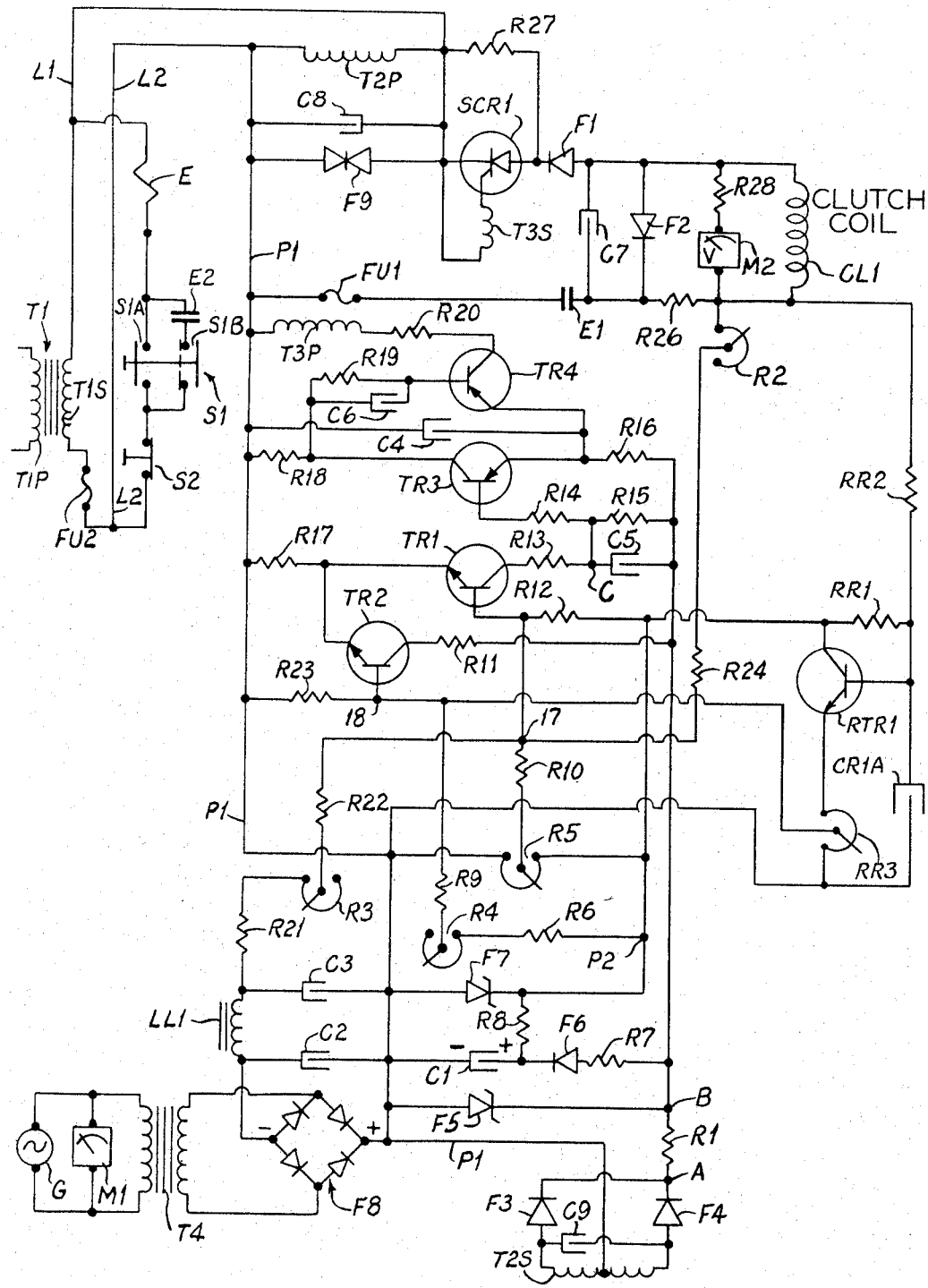
FIG. 4 is a schematic diagram of another embodiment of the system of FIG. 1.

Referring now to FIG. 4, a second embodiment of this invention is illustrated. It differs from the control described in FIG. 2 in that a more preferred regenerative delay network 26 is provided. Considering the extremely wide speed ranges over which the present invention will closely regulate the speed, the physical size and cost of capacitor CR1 can become cumbersome and substantial. This FIG. 4 embodiment utilizes a capacitance multiplier including an electronic transducer, transistor RTR1, having its base or control electrode connected to the junction between resistor RR2 and a capacitor CR1A, and its emitter-collector circuit and a potentiometer RR3 serially connected across resistor RR1 and capacitor CR1A. The movable arm or contact of RR3 is connected to junction 18. Thus, resistor RR2 and capacitor CR1A comprise a regenerative delay network and transistor RTR1 matches the resistance of RR3 to that of RR2, and therefore RR2 may be large and CR1A may be very small. Hence, capacitor CR1A is of a much lower capacitance value and much more compact and less expensive than capacitor CR, but because of the capacitance multiplier effect of this FIG. 4 circuitry including the transistor RTR1, the capacitance of CR1A is made effectively the same as that of CR1. The actual size of the circuitry components of the capacitance multiplier is such that it requires only about one-quarter of the volume of the capacitor CR1.

The operation of the control of FIG. 4 is the same as that described above in regard to FIG. 2, except that a regulation control, potentiometer RR3, provides a means which, in conjunction with the sensitivity control R2, permits precise adjustment of regulation commensurate with system stability.

In view of the above, it will be seen that the several objects of the invention are achieved and other advantageous results attained.

As various changes could be made in the above constructions and circuits without departing from the scope of the invention, it is intended that all matter contained in the above description or shown in the accompanying drawings shall be interpreted as illustrative and not in a limiting sense.

What is claimed is:

1. In a controlled-velocity drive having a driven member and a winding the energization of which controls the speed of said driven member, a source of electrical power, and a solid-state switching device interconnected between said source and said winding and adapted selectively to control the energization of said winding thereby to regulate the angular velocity of said driven member; a control for said switching device comprising means for producing a reference voltage proportional to a preselected angular velocity of said driven member, a first feedback circuit sensing the angular velocity of said driven member and producing a first feedback signal which varies as a function thereof, a second feedback circuit responsive to the current through said winding and providing a second feedback signal which varies as a function thereof, a third feedback circuit including a delay network also responsive to the current through said winding and providing a regenerative feedback signal which varies as a function thereof, and means responsive to said reference voltage and to said three feedback signals for selectively actuating said switching device to maintain the angular velocity of said driven member substantially equal to said preselected angular velocity.

2. In a controlled-velocity drive as set forth in claim 1, said second and third feedback circuits commonly including a resistor connected in series with said winding whereby the voltage across said resistor is proportional to the current through said winding.

3. In a controlled-velocity system as set forth in claim 2, said second feedback circuit further comprising a variable resistance interconnected with said resistor, the setting of said variable resistance determining the amplitude of said second feedback signal, said delay network including an RC circuit to effect an attenuation in system frequency response.

4. In a controlled-velocity drive as set forth in claim 3, said delay network including a capacitance multiplier having an electronic transducer.

5. In a controlled-velocity drive as set forth in claim 1, said means for selectively actuating said switching device including a differential amplifier having a first input comprising a first summing junction of one polarity and a second input comprising a second summing junction of a second polarity, said reference voltage and said first and second feedback signals being commonly applied to said first summing junction, and said regenerative feedback signal being applied to said second summing junction.

6. In a controlled-velocity drive having a driven member, an electromagnetic coupling provided with a control winding, a source of electrical power, and a solid-state switching device interconnected between said source and said winding and adapted selectively to control the energization of said winding thereby to regulate the angular velocity of said driven member; a control for said switching device comprising means for producing a reference voltage proportional to a preselected angular velocity of said driven member, a first feedback circuit sensing the angular velocity of said driven member and producing a first feedback signal which varies as a function thereof, a second feedback circuit responsive to the current through said winding and providing a second feedback signal which varies as a function thereof, a third fedback circuit including a delay network also responsive to the current through said winding and providing a regenerative feedback signal which varies as a function thereof, a capacitor, a charging circuit for said capacitor including a first electronic transducer interconnected with said capacitor, the conductivity of said first transducer controlling the charging rate of said capacitor, means for varying the conductivity of said first transducer including a second transducer interconnected with said first transducer in a differential amplifier circuit having a first input comprising a first summing junction and a second input comprising a second summing junction, said reference voltage and said first and second feedback signals being commonly applied to said first summing junction, said regenerative feedback signal being applied to said second summing junction whereby the charging rate of said capacitor is a function of said reference voltage and said three feedback signals, a trigger circuit responsive to the voltage across the capacitor for pulsing said switching device thereby to cause energization of said winding when said voltage reaches a preestablished level thereby to maintain the angular velocity of said driven member substantially equal to said preselected angular velocity.

7. In a controlled-velocity drive as set forth in claim 6, said first feedback circuit including a tachometer for sensing the angular velocity of said driven member and producing a first negative feedback signal which varies as a function thereof, said second and third feedback circuits commonly including a resistor connected in series with said winding whereby the voltage across said resistor is proportional to the current through said winding, said second feedback circuit further comprising a variable resistance interconnected with said resistor, the setting of said variable resistance determining the amplitude of said second feedback signal, and said delay network including an RC circuit to effect an attenuation in system frequency response.

8. In a controlled-velocity drive as set forth in claim 7, said delay network including a capacitance multiplier including a transistor.

9. In a controlled-velocity drive as set forth in claim 7, the RC circuit of said third feedback circuit and delay network including a second resistor and a second capacitor series-connected across the aforesaid resistor, the electrical junction between said second resistor and second capacitor being connected to the control electrode of a transistor having an emitter-collector circuit series-connected with a second variable resistance across said second capacitor, said second variable resistance having a movable contact connected to said second summing junction whereby the capacitance parameters of said second capacitor are effectively multiplied and the regulation and stability of said system may be adjusted.

10. In a controlled-velocity drive as set forth in claim 9, said trigger circuit comprising a pair of transistors interconnected to form a Schmitt trigger circuit configuration, said solid-state switching device comprising a silicon controlled rectifier, the anode-cathode circuit of said rectifier being connected across an A.C. power source whereby the duration of periods of conduction of said silicon controlled rectifier during a cycle of said A.C. controls the degree of energization of said winding thereby to control the angular velocity of said driven member.

11. In a controlled-velocity drive as set forth in claim 10, said first and second transducers comprising first and second transistors positioned in a common heat sink arrangement wherein a variation in the conductivity of said first transistor caused by a temperature-induced variation in the base-emitter resistance thereof is compensated for by a variation in the conductivity of said second transistor which effects a compensating change in the base-emitter bias of said first transistor.

No References Cited.

ROBERT K. SCHAEFER, *Primary Examiner.*

H. O. JONES, *Assistant Examiner.*